United States Patent
Walker et al.

(10) Patent No.: US 8,068,432 B2
(45) Date of Patent: Nov. 29, 2011

(54) PRIORITY-BASED NETWORK FAULT ANALYSIS

(75) Inventors: Anthony Paul Michael Walker, Fort Collins, CO (US); Darren D. Smith, Fort Collins, CO (US); Russell John Huonder, Windsor, CO (US); David M. Rhodes, Loveland, CO (US); Kam Chooi Wong, Ft Collins, CO (US); Srikanth Natarajan, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1794 days.

(21) Appl. No.: 10/986,966

(22) Filed: Nov. 12, 2004

(65) Prior Publication Data

US 2006/0104208 A1 May 18, 2006

(51) Int. Cl.
*G01R 31/08* (2006.01)

(52) U.S. Cl. .......................... 370/242; 370/449

(58) Field of Classification Search .................. None
See application file for complete search history.

(56) References Cited

U.S. PATENT DOCUMENTS

| | | | |
|---|---|---|---|
| 5,434,861 A * | 7/1995 | Pritty et al. | 370/449 |
| 6,505,205 B1 * | 1/2003 | Kothuri et al. | 1/1 |
| 6,711,606 B1 * | 3/2004 | Leymann et al. | 709/203 |
| 6,728,514 B2 * | 4/2004 | Bandeira et al. | 455/13.1 |
| 7,103,795 B1 * | 9/2006 | Hansen | 714/4 |
| 7,324,634 B2 * | 1/2008 | Hoy et al. | 379/133 |
| 2002/0055790 A1 * | 5/2002 | Havekost | 700/80 |
| 2002/0163427 A1 * | 11/2002 | Eryurek et al. | 340/500 |
| 2003/0191730 A1 * | 10/2003 | Adkins et al. | 706/47 |
| 2004/0034871 A1 * | 2/2004 | Lu et al. | 725/111 |
| 2007/0280291 A1 * | 12/2007 | Beser | 370/468 |

* cited by examiner

*Primary Examiner* — Kevin C Harper
*Assistant Examiner* — Rhonda Murphy (57) ABSTRACT

A method and system for reducing fault analysis times in a network having a plurality of pollable objects. Poll responses are received from pollable objects, priorities are assigned to each received poll response in accordance with one or more of a received poll response value, a pollable object status and a type of pollable object, and the assigned priorities are processed and to determine any fault locations, wherein a pollable object with a higher priority is processed before a second pollable object with a lower priority. A status manager is operable to receive poll responses from one or more of the pollable objects, a status analyzer is operable to assign, in conjunction with one or more analyzers, priorities to each received poll response in accordance with the received poll response value, a pollable object status and a type of pollable object, and analyzers coupled the status analyzer use the assigned priorities and the corresponding received poll responses to determine a fault location.

42 Claims, 5 Drawing Sheets

PRIORITY-BASED NETWORK FAULT ANALYSIS

TECHNICAL FIELD

The present invention relates generally to communications networks and, more particularly, to a system and a method for network failure analysis in a communications network.

BACKGROUND

Modern communication networks are composed of many nodes that are interconnected to facilitate communication and provide redundancy. These nodes may be interconnected via cables, twisted pair, shared media or similar transmission media. Each node may include, for example, communication devices, interfaces, and addresses. The topology that describes how the nodes of a communication network are interconnected can be complicated.

Modern networks include redundancy in the data link and routing layers. Even so, when a core device fails in the network it can cause different parts of the network to be disconnected from a network management station. It is the responsibility of the network management system poller and analyzer to find these faults and determine the root cause without burdening the operator with superfluous information about impacted devices. When there is a failure within the communication network, a network manager needs to accurately determine where the failure occurred and the severity of the failure in an efficient manner so that affected nodes are impacted for as little time as necessary. One approach to respond to a network failure is to process network events as they occur in a first-in first-out (FIFO) fashion. However, when the network has many nodes there may be numerous nodes impacted by single network failure. In this case a FIFO approach to failure analysis leads to a long mean time to locate and fix the failure.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 1:
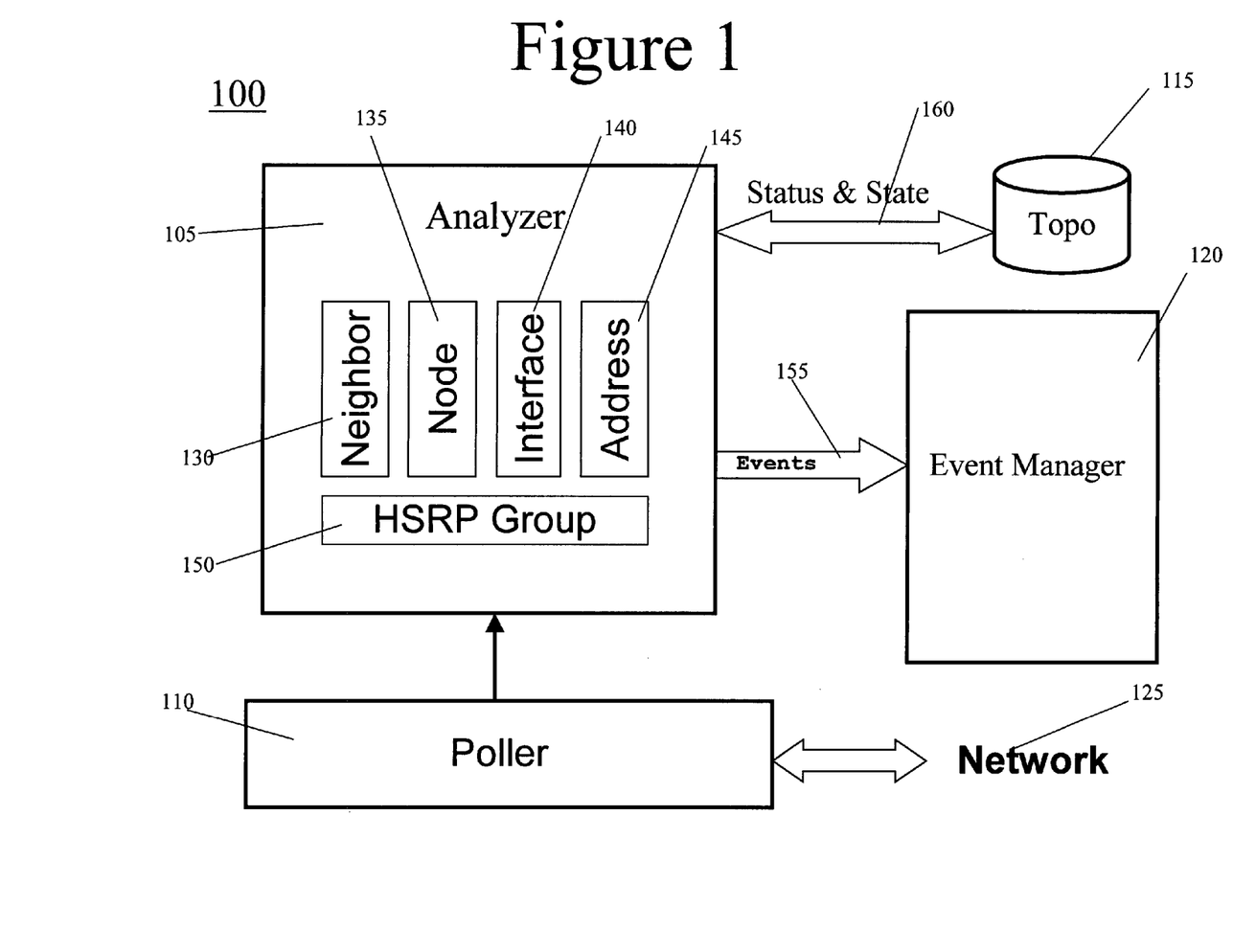
FIG. 1 is a system level diagram of a network monitoring system.

With reference to FIG. 1 a system level diagram of a network monitoring system 100 is shown, according to certain embodiments of the present invention. It is noted that the components shown in FIG. 1 may be distributed throughout network 125 without departing from the spirit and scope of the invention. Poller 110 interacts with network 125 to query a status of pollable objects of network 125. Poller 110 is operable to collect state information using the Simple Network Management Protocol (SNMP), the Internet Control Management Protocol (ICMP), or any network protocol that is able to provide state information. Pollable objects may comprise, for example, network interfaces and their associated Internet Protocol (IP) addresses, connections, network electronic components (such as a printed circuit board), computers, routers, network address translation (NAT) subsystems, end nodes, and egress routers. An egress router is that router that is one hop downstream (away from the network manager 100) from a NAT node. An egress router is thus an entrance router into a private network domain. An end node is a node that is not a switch or router.

When a pollable object fails a poll, analyzer 105 interacts with poller 110 and the status and state information 160 received from topology 115 of the network 125 to determine the root cause of the failure. A pollable object may be considered to have failed if the pollable object does not respond to a poll or responds with an indication of failure. In certain embodiments, the analyzer 105 also analyzes situations in which a poll response is different from a previous poll response. The analyzer 105 further comprises an address analyzer 145, interface analyzer 140, node analyzer 135, neighbor analyzer 130, and Hot Standby Routing Protocol (HSRP) group analyzer 150. It is noted that other types of analyzers specific to the types of pollable objects could be used without impacting the scope of invention, for example an IP Telephony analyzer. Analyzer 105 interacts with poller 150, address analyzer 145, interface analyzer 140, node analyzer 135, HSRP group analyzer 150 and neighbor analyzer 130 to ensure that the appropriate level of analysis used has the necessary information. In certain embodiments, a containment hierarchy is used so that a location of the failure is determined by applying address analyzer 145 first then interface analyzer 140 is applied, then node analyzer 135 is applied and then neighbor analyzer 130 is applied. HSRP group 150 is applied to a group of nodes that support the HSRP protocol, and so may be applied separate of the containment hierarchy. This bottom-up analysis technique is useful in locating the root cause while also minimizing the number of peripheral devices that are reported to the network manager 100.

Analyzer 105 receives the poll results from poller 110 and status and state information 160 from the network topology 115 and determines which analyzer (130, 135, 140, 145, 150) processes this information to determine the root cause of the failure based upon the type of failed object. The term "state" comprises those attributes of a polled object as measured from the polls, and "status" comprises a summarization of the health of the node, e.g. "Normal", "Warning", "Minor", "Major", "Critical", "Unknown", and "Unmanaged". As a result of applying one or more of address analyzer 145, interface analyzer 140, node analyzer 135, HSRP group analyzer 150 and neighbor analyzer 130, events 155 are generated that are useable by event manager 120.

It is noted that the elements of FIG. 1 are arranged for exemplary purposes, and other arrangements are possible without departing from the spirit and scope of the present invention. It is further noted that while network 125 may contain a great many pollable objects, the analyzers in FIG. 1 such as neighbor analyzer 130 may in certain embodiments only poll and interact with a subset of the pollable objects in the network 125.

One application of the output of analyzer 105 is a representation of the ability of pollable objects to respond via the network communication protocols of the network 125. For example, for a given fault, the nodes of network 125 may be partitioned into a Normal area, a Fault area, and a Far-From-Fault area:

Normal Area: The area of the network near the network monitoring system 100 where all the pollable objects are operational and can be accessed via ICMP or SNMP. This area could be large (multiple hops and large numbers of monitored objects).

Fault Area: This area includes pollable objects that contain a fault or are directly connected to a device downstream from the network monitoring system 100 that contains a fault. This area can be a small portion of the network and contains a much smaller number of pollable objects.

Far-From-Fault Area: This corresponds to pollable objects that are downstream from the fault. That is, if you traverse a path from the network monitoring system 100 to these pollable objects, you will pass through the Normal Area and then the Fault Area and finally devices in the Far-From-Fault Area.

A poll could fail (NORESPONSE or timeout), indicating there is no response, so either the pollable object is unreachable or unavailable. It could succeed in communicating with the pollable object, and the value returned could indicate a normal operational state (UP), or other kinds of operational states indicating failures (DOWN) or other conditions. There could also be a failure of the protocol query itself, in the case of unusual failure modes. A successful poll with a normal state would be in the Normal Area, a successful poll but with a failure state returned would indicate a node near the Fault Area, and a poll failure due to timeout would likely indicate a node Far From Fault.

Figure 2:
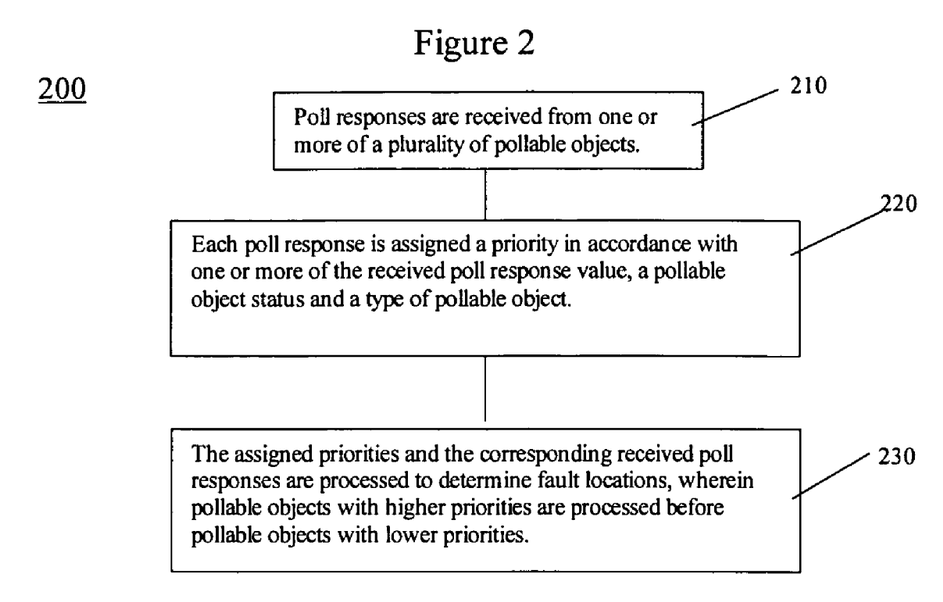
FIG. 2 is a flow diagram illustrating a method to reduce fault analysis times in a network monitoring system, according to certain embodiments of the present invention.

In some cases, when there is a failure of network 125, many pollable objects fail to respond to a poll and analyzer 105 receives many polling failures which must be analyzed to determine the root cause of the failure. Polling failures from the Fault Area are clearly more relevant to locating the root cause than polling failures in the Far-From-Fault Area. If polling failures from the Fault Area are given a higher priority for analysis than polling failures from the Far-From-Fault Area, then the mean time to locate the root cause of a failure is reduced. This concept may be generalized by assigning a pollable object status to each pollable object and analyzing the polling failures in accordance with a priority assigned to each pollable object. The pollable object status indicates the success, failure or timeout indication of the pollable object. The priority may be determined in part from the pollable object status which may be used to infer that the pollable object is in a Fault Area. This approach is summarized with reference to FIG. 2, which shows a flow diagram 200 illustrating a method to reduce fault analysis times in network monitoring system 100. After receiving poll responses from one or more of a plurality of pollable objects (block 210), each poll response is assigned a priority in accordance with one or more of the received poll response value, a pollable object status and a type of pollable object (block 220), and the assigned priorities and the corresponding received poll responses are processed to determine fault locations, wherein pollable objects with high priorities are processed before pollable objects with low priorities (block 230). The performance of the analyzer 105 may be modeled using several metrics, including, of "mean time from failure to report of root cause", "mean time from failure to fix of root cause" and "mean time from failure to processing of all impacted devices". The mean time from failure to report of root cause is the average time it takes from when a failure occurs, to the time an operator is notified of the root cause of the failure via event manager 120. The mean time from failure to fix of root cause is the average time of the "mean time from failure to report of root cause" plus the time it takes to respond to and fix the cause of the failure. The mean time from failure to processing of all impacted devices is the average time it takes from when a failure occurs in the network 125 to when all polling results have been processed by the analyzers 105

Figure 3:
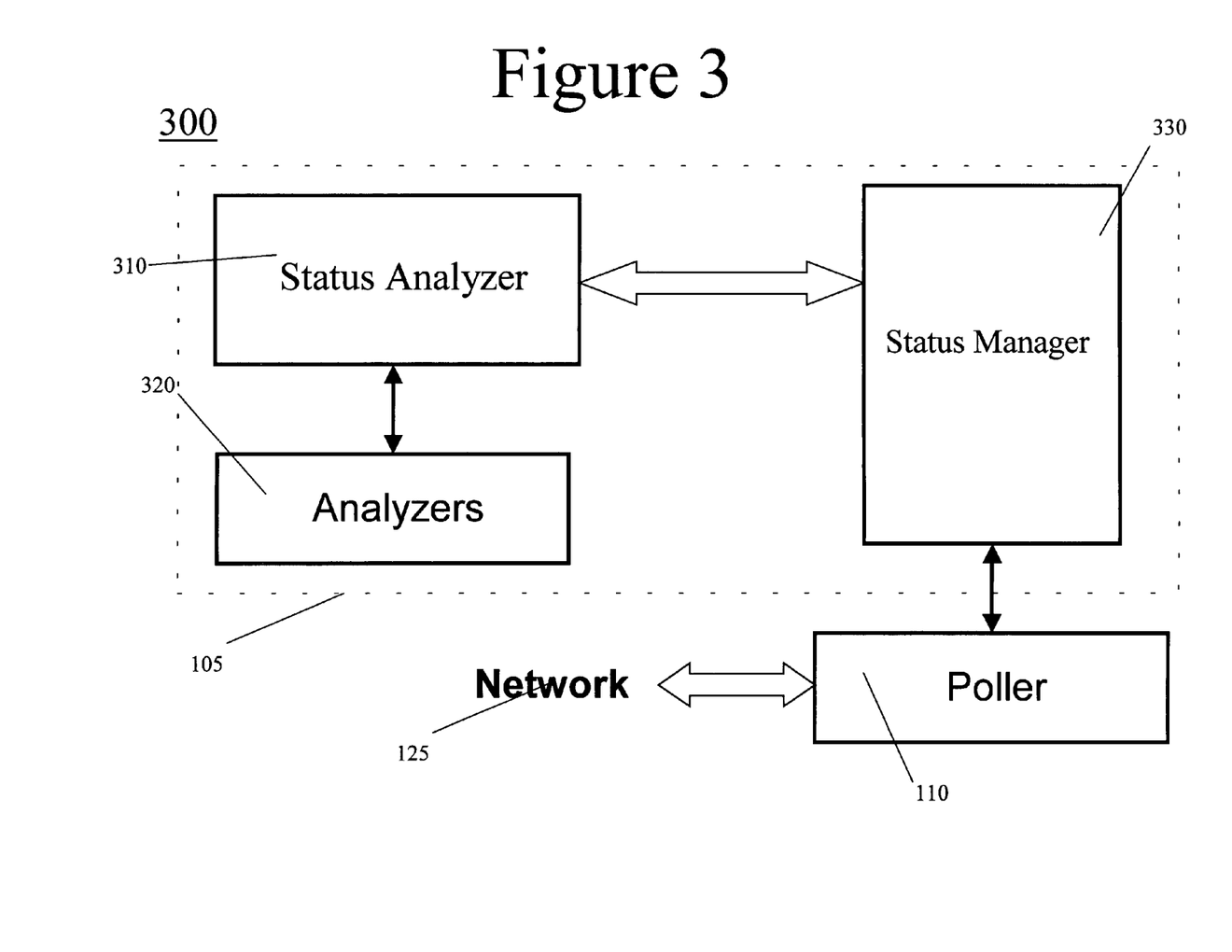
FIG. 3 is a system level diagram of a network monitoring system to reduce fault analysis times in a network, according to certain embodiments of the present invention.

With reference to FIG. 3 a system level diagram 300 of a system to reduce fault analysis times in network monitoring system 100 is shown, according to certain embodiments of the present invention. One or more poll responses of a poll of the plurality of pollable objects of network 125 are passed to status analyzer 310. Status analyzer 310 interprets the poll results and invokes one or more analyzers of analyzers 320. The status manager 330 is operable to receive poll responses from one or more of the plurality of pollable objects via poller 110. In certain embodiments poller 110 uses more than one thread to poll the plurality of pollable objects. The status analyzer 310 is operable to assign, in conjunction with the analyzers 320, priorities to each received poll response of the received poll responses in accordance with one or more of the received poll response value, a pollable object status and a type of pollable object. In certain embodiments, the type of pollable object is one of a gateway device, network electronics component (for example a printed circuit board), egress device, end node, address, interface, and node. The pollable object status is one of (listed in order of decreasing priority): UP, DOWN, UNDETERMINED, MARGINAL, NORESPONSE, and VALIDATE. In certain cases, a pollable object of the plurality of pollable objects is given a status of MARGINAL if the pollable object comprises a contained object that has a status of DOWN. The received poll response value is one of reachable, unreachable. In certain embodiments, the assigned priorities may be initially given a default value by status analyzer 310 prior to one or more analyzers of analyzers 320 modifying the default values of the assigned priorities. In certain embodiments the default value is determined based on the pollable object status and poll response value. The priority is then adjusted by the type specific analyzer based on topology attributes such as whether the node is an egress router.

In certain embodiments, status analyzer 310 lists and sorts by priority the received poll responses. It is further noted that the priorities of the pollable objects are operable to be assigned by the analyzers 320. Analyzers 320 are coupled to the status analyzer 310, and one or more analyzers of analyzers 320 are operable to use the assigned priorities and the corresponding received poll responses to determine a fault location. The status analyzer 310 is operable to select which of the analyzers 320 is used to process the assigned priorities and the received poll responses to determine the fault location. Analyzers are chosen based on the type of the pollable object, so that the Node Analyzer is chosen if the pollable object is a node, end node, gateway or egress router, switch, or other computing device. Similarly, the Interface Analyzer is chosen if the pollable object is an interface contained in a node, the Address Analyzer is chosen if the pollable object is an IP Address, and the HSRP Analyzer is chosen if the pollable object is an HSRP group. For the plurality of pollable objects a pollable object with a higher priority is processed before a second pollable object with a lower priority. In certain embodiments analyzers 320 uses more than one thread to poll the plurality of pollable objects.

Figure 4:
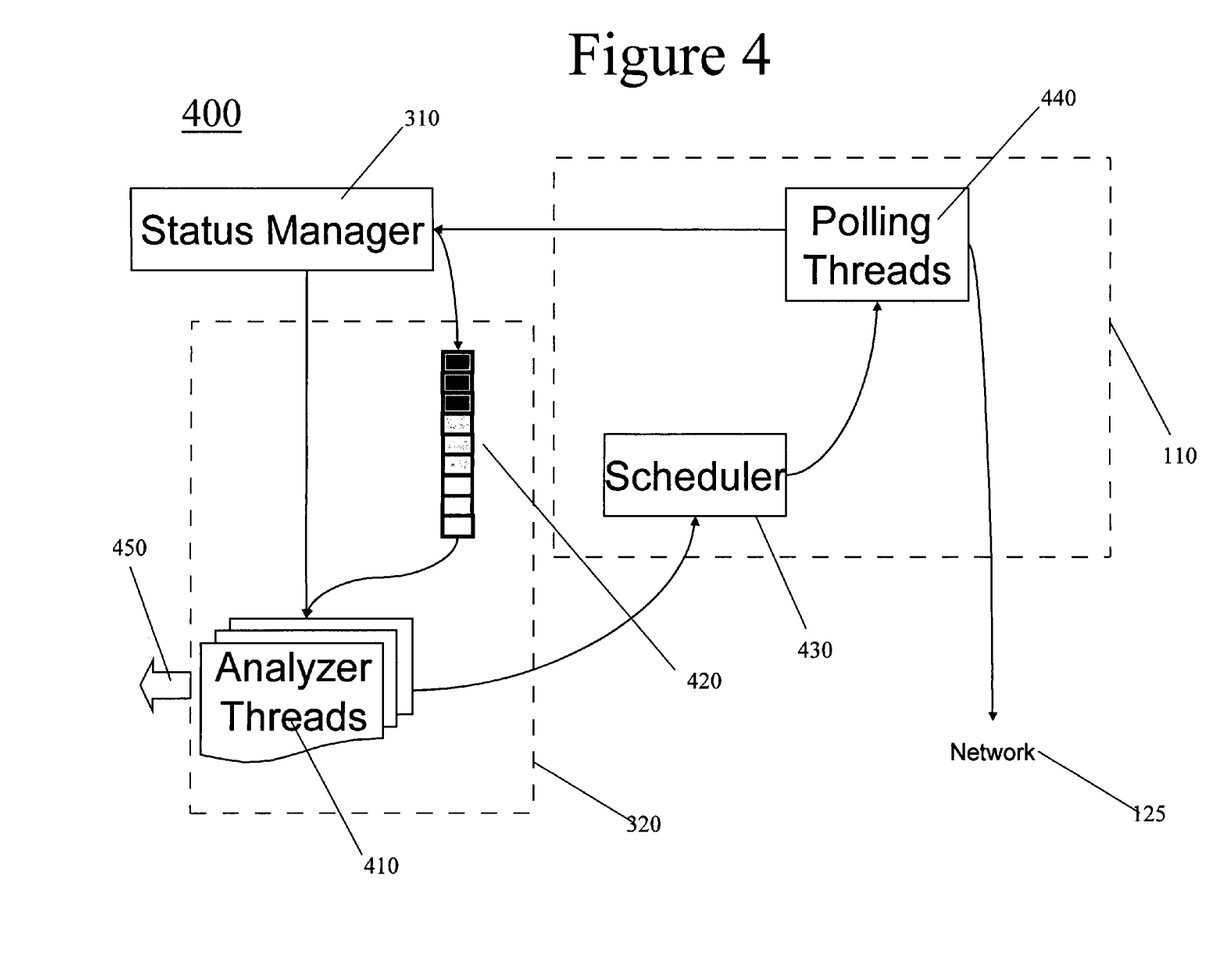
FIG. 4 is a system level diagram of a network monitoring system for analyzing a network comprising a plurality of pollable objects, according to certain embodiments of the present invention.

Referring now to FIG. 4 a system level diagram of network monitoring system 100 for analyzing network 125 is shown, according to certain embodiments of the present invention. Status Manager 310 starts the analyzers 320 and the analyzer threads 410. Analyzers 320 comprise one or more analyzers that set the corresponding priorities of the poll responses. The analyzer threads 410 interact with scheduler 430 to collect polling information via polling threads 440 for the pollable objects that are scheduled to be polled. The poll responses are passed to status manager 310 and the poll responses with the associated priorities are listed in queue 420 by status manager 310. In certain embodiments, the priorities are initialized to a default value by status manager 310 and may be modified by one or more analyzers of analyzers 320. The poll response with the highest priority is then passed to one or more analyzer threads 410 for resolution. The results of the processing of analyzer threads 410 are propagated to the rest of the network as shown in flow 450. It is noted that in certain embodiments analyzers 320 may perform additional polls of the plurality of pollable objects as part of the analysis process.

When the status manager receives notification that there is a failure, it determines the appropriate analyzer based on the type of object. The analyzer is then requested to choose a priority based on the type of object, and the type of notification. In certain embodiments, priorities range from lowestPriority to highestPriority with a number of levels in between. The actual priorities are set by the specific analyzers, but a default priority is set in the base analyzer class based on the type of notification. Table 1 below summarizes the default priorities for the different status values of pollable objects. Table 2 illustrates how the status value may be overridden in certain embodiments.

TABLE 1

| StatusValue | PRIORITY | COMMENTS |
| --- | --- | --- |
| DOWN | High | Pollable Object reported a failure or abnormal condition. |
| UP MARGINAL | Medium | Pollable Object is now up and responding to polls. Want to process after the downs but before the less reliable NORESPONSE. |
| UNDETERMINED NORESPONSE | Low | Can get a large number of these on the queue during a large failure. Most of these are far from fault, so process after most other items. |
| VALIDATE | Very Low | At startup and incremental discovery time, we validate the state of changed and new pollable objects. Do this as we have bandwidth to handle it. |

TABLE 2

| OBJECT TYPE | StatusValue | PRIORITY | COMMENTS |
| --- | --- | --- | --- |
| HSRP Group | <any> | Set based on default | For HSRP Analysis, we just rely on the default settings above. |
| Egress or Gateway Router | DOWN UP UNDETERMINED UNRESPONSIVE | High | If this router goes down, it's likely the root cause. |
| Node Interface or IP address | UP and old status was DOWN or MARGINAL | Medium High | This is an up event near the fault, so process faster than other up events. |

The general concept as exemplified by the above status value—priority assignments is that the root cause failure should be emitted as quickly as possible, and that most unresponsive nodes will be far from the actual failure. The queue then inserts based on the priority, so that high priority goes on the front of the queue. Queue processing takes into account both the priority and the availability. In certain embodiments, a high priority entry that is blocked due to the pollable object being busy may be skipped until the node is no longer blocked. In certain embodiments, if a successful poll occurs on a pollable object that previously failed a poll, this is given a medium high priority, so that root cause failures that have previously been indicated to an operator of network management system 100 can be cleared quickly. It is noted that in certain embodiments, structures other than a queue may be used to list and sort poll responses and priorities.

Figure 5:
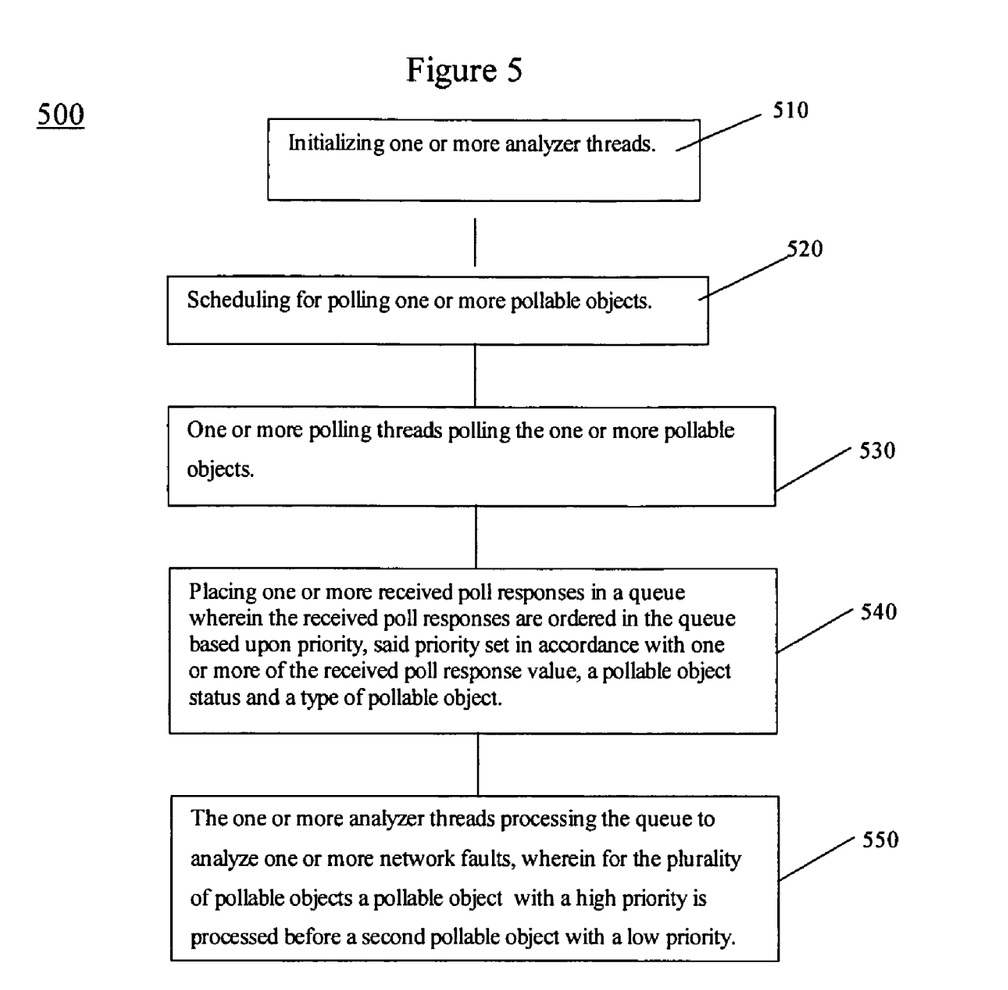
FIG. 5 is a flow diagram illustrating a method for analyzing a network comprising a plurality of pollable objects, according to certain embodiments of the present invention.

The method discussed in relation to FIG. 4 is summarized in FIG. 5. Referring now to FIG. 5 a flow diagram illustrating a method for analyzing network 125, according to certain embodiments of the present invention. One or more analyzer threads are initialized (block 510). The one or more pollable objects that are going to be polled are scheduled (block 520). The polling of the one or more pollable objects uses one or more polling threads (block 530). The one or more received poll responses are placed in a queue wherein the received poll responses are ordered in the queue based upon priority, said priority set in accordance with one or more of the received poll response value, a pollable object status and a type of pollable object (block 540). The one or more analyzer threads process the queue to analyze one or more network faults. For the plurality of pollable objects a pollable object with a high priority is processed before a second pollable object with a low priority (block 550).

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors, which are equivalents to the invention as described and claimed. Similarly, general purpose computers, microprocessor based computers, micro-controllers, optical computers, analog computers, programmable logic circuits, dedicated processors and/or dedicated hard wired logic may be used to construct alternative equivalent embodiments of the present invention.

In accordance with certain embodiments, a computer readable storage medium may be used to store instructions that, when executed on a programmed processor, carry out a method of reducing fault analysis time in a network, having instructions for receiving one or more poll responses from one or more of the plurality of pollable objects; instructions for assigning priorities to each received poll response of the one or more received poll responses in accordance with one or more of a received poll response value, a pollable object status and a type of pollable object; and instructions for processing the assigned priorities and the corresponding received poll responses to determine any fault locations, wherein for the plurality of pollable objects a poll result of a pollable object with a higher priority is processed before a second poll result of a second pollable object with a lower priority.

Those skilled in the art will also appreciate upon consideration of this teaching that the program steps and associated data used to implement such programming can use any suitable computer readable storage medium such as for example disc storage, Read Only Memory (ROM) devices, Random Access Memory (RAM) devices, semiconductor storage elements, optical storage elements, magnetic storage elements, magneto-optical storage elements, flash memory, core memory and/or other equivalent storage technologies. Such alternative storage devices should be considered equivalents.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A method for reducing network infrastructure fault analysis times in a network comprising a plurality of pollable network infrastructure objects, comprising:
    determining a fault area within the network, the fault area comprising a portion of the network comprising network infrastructure objects that contain a fault and network infrastructure objects not containing faults that are directly connected to the network infrastructure objects that contain a fault;
    sending polls targeting each network infrastructure object within the fault area;
    receiving poll responses from the pollable network infrastructure objects within the fault area;
    assigning priorities to each received poll response of the received poll responses; and
    processing the assigned priorities of the received poll responses and the corresponding received poll responses to determine any network infrastructure fault locations within the fault area, wherein for the plurality of pollable network infrastructure objects a poll result of a pollable network infrastructure object with a higher priority is processed before a second poll result of a second pollable network infrastructure object with a lower priority.

2. The method of claim 1, wherein the network infrastructure fault analysis times are selected from the group consisting of:
    mean time from failure to report of root cause;
    mean time from failure to fix of root cause; and
    mean time from failure to processing of all impacted network infrastructure devices.

3. The method of claim 1, further comprising using more than one thread to poll the plurality of pollable network infrastructure objects.

4. The method of claim 1, further comprising listing and sorting by priority the received poll responses with assigned priorities.

5. The method of claim 1, further comprising using one or more threads to analyze the received poll responses.

6. The method of claim 1, wherein an UP pollable network infrastructure object status and a DOWN pollable network infrastructure object status has a higher priority than a NORESPONSE pollable network infrastructure object status.

7. The method of claim 1, further comprising assigning the plurality of pollable network infrastructure objects a default priority, wherein the default priority is set in accordance with one or more of the pollable network infrastructure object status and a poll response value.

8. The method of claim 7, further comprising setting the default priority to one or more of:
    High, when the pollable network infrastructure object status is DOWN;
    Medium, when the pollable network infrastructure object status is one of UP and MARGINAL;
    Low, when the pollable network infrastructure object status is one of UNDETERMINED and NORESPONSE; and
    Very Low, when the pollable network infrastructure object status is VALIDATE.

9. The method of claim 7, further comprising overriding the default priority using one or more of the pollable network infrastructure object type and the pollable network infrastructure object status.

10. The method of claim 9, further comprising overriding the default priority to one of:
    High, when the pollable network infrastructure object is one of an Egress router and a gateway router and the pollable network infrastructure object status is one of DOWN, UP, UNDETERMINED, and UNRESPONSIVE; and
    Medium High, when the pollable network infrastructure object is one of a node, interface and IP address and the pollable network infrastructure object status is UP and a previous pollable network infrastructure object status value is one of DOWN and MARGINAL.

11. The method of claim 1, further comprising assigning pollable network infrastructure objects in a Fault Area a higher priority than pollable network infrastructure objects in a Far-From-Fault Area.

12. A system operable to reduce network infrastructure fault analysis times of a network comprising a plurality of pollable network infrastructure objects, the system comprising:
    a status manager operable to receive poll responses from each of the plurality of pollable network infrastructure objects within a fault area, the fault area comprising a portion of the network comprising network infrastructure objects that contain a fault and network infrastructure objects not containing faults that are directly connected to the network infrastructure objects that contain a fault;
    a status analyzer operable to assign, in conjunction with one or more analyzers, priorities to each received poll response of the received poll responses; and
    one or more analyzers coupled to the status analyzer, said one or more analyzers operable to use the assigned priorities of the received poll responses and the corresponding received poll responses to determine a network infrastructure fault location within the fault area, wherein for the plurality of pollable network infrastructure objects a poll response for a pollable network infrastructure object with a higher priority is processed before a second poll response for a second pollable network infrastructure object with a lower priority.

13. The system of claim 12, wherein the type of pollable network infrastructure object is selected from the group consisting of a gateway device, an egress device, an end node, a network electronic component and a node.

14. The system of claim 13, wherein the pollable network infrastructure object status is selected from the group consisting of UP, DOWN, MARGINAL, UNDETERMINED, NORESPONSE, and VALIDATE.

15. The system of claim 12, wherein the received poll response value is one of reachable AND unreachable.

16. The system of claim 12, wherein pollable network infrastructure objects in a Fault Area are operable to be processed before pollable network infrastructure objects in a Far-From-Fault Area.

17. The system of claim 12, wherein the network infrastructure fault analysis times are selected from the group consisting of:
   mean time from failure to report of root cause;
   mean time from failure to fix of root cause; and
   mean time from failure to processing of all impacted network infrastructure devices.

18. The system of claim 12, wherein more than one thread produced by a poller is used to poll the plurality of network infrastructure objects.

19. The system of claim 12, wherein the status analyzer lists and sorts by priority the received poll responses with assigned priorities.

20. The system of claim 12, wherein one or more analyzers of the status analyzer are operable to process the assigned priorities and the received poll responses to determine the network infrastructure fault location.

21. The system of claim 20, wherein the status analyzer is operable to select which analyzer of the one or more analyzers is used to process the assigned priorities and the received poll responses to determine the network infrastructure fault location.

22. The system of claim 21, wherein the analyzer assigns the assigned priority.

23. The system of claim 20, wherein more than one thread is used by the one or more analyzers.

24. A method for analyzing a network comprising a plurality of pollable network infrastructure objects, the method comprising:
   initializing one or more analyzer threads;
   scheduling for polling pollable network infrastructure objects within a fault area, the fault area comprising a portion of the network comprising network infrastructure objects that contain a fault and network infrastructure objects not containing faults that are directly connected to the network infrastructure objects that contain a fault;
   one or more polling threads polling each of the pollable network infrastructure objects;
   placing received poll responses in a queue wherein the received poll responses are ordered when received in the queue based upon priority; and
   the one or more analyzer threads processing the received poll responses of the queue to determine one or more network infrastructure fault locations within the fault area, wherein for the plurality of pollable network infrastructure objects a poll result of a pollable network infrastructure object with a higher priority is processed before a second poll result of a second pollable network infrastructure object with a lower priority.

25. The method of claim 24, further comprising using one or more threads to process the assigned priorities and the received poll responses.

26. The method of claim 24, further comprising assigning the plurality of pollable network infrastructure objects a default priority, wherein the default priority is set in accordance with one or more of a pollable network infrastructure object status and a poll response value.

27. The method of claim 26, further comprising overriding the default priority using one or more of the pollable network infrastructure object type and the pollable network infrastructure object status.

28. The method of claim 27, further comprising setting the default priority to one or more of:
   High, when the pollable network infrastructure object status is DOWN;
   Medium, when the pollable network infrastructure object status is one of UP and MARGINAL;
   Low, when the pollable network infrastructure object status is one of UNDETERMINED and NORESPONSE; and
   Very Low, when the pollable network infrastructure object status is VALIDATE.

29. The method of claim 28, further comprising overriding the default priority to one of:
   High, when the pollable network infrastructure object is one of an Egress router and a gateway router and the pollable network infrastructure object status is one of DOWN, UP, UNDETERMINED, and UNRESPONSIVE; and
   Medium High, when the pollable network infrastructure object is one of a node, interface and IP address and the pollable network infrastructure object status is UP and a previous pollable network infrastructure object status value is one of DOWN and MARGINAL.

30. The method of claim 24, further comprising assigning pollable network infrastructure objects in a Fault Area a higher priority than pollable network infrastructure objects in a Far-From-Fault Area.

31. A system operable to analyze pollable network infrastructure objects of a network, comprising:
   one or more analyzer threads operable to schedule pollable network infrastructure objects to be polled within a fault area, the fault area comprising a portion of the network comprising network infrastructure objects not containing faults that contain a fault and network infrastructure objects that are directly connected to the network infrastructure objects that contain a fault;
   one or more polling threads operable to poll each of the pollable network infrastructure objects within the fault area;
   a status manager operable to receive poll responses from the plurality of pollable network infrastructure objects;
   a status analyzer operable to assign, in conjunction with one or more analyzers, a priority to each received poll response when received,
   wherein the status analyzer is operable to place the received poll responses in a queue sorted by priority; and
   one or more analyzers coupled to the status analyzer and operable to process the received poll responses in the queue to determine the location of any network infrastructure faults within the fault area, wherein for the plurality of pollable network infrastructure objects a pollable network infrastructure object with a high priority is processed before a second pollable network infrastructure object with a low priority.

32. The system of claim 31, wherein more than one thread is operable to be used to poll the plurality of network infrastructure objects.

33. The system of claim 31, wherein one or more analyzers are coupled with the status analyzer, said one or more analyzers operable to process the assigned priorities and the received poll responses to determine the network infrastructure fault location.

34. The system of claim 33, wherein the status analyzer is operable to select which analyzer of the one or more analyzers is used to process the assigned priorities and the received poll responses to determine a network infrastructure fault location.

35. The system of claim 34, wherein the status analyzer is operable to assign a default priority, wherein the default priority is set in accordance with one or more of a pollable network infrastructure object status and a poll response value.

36. The system of claim 33, wherein an analyzer of one or more analyzers is operable to override the default priority using one or more of the pollable network infrastructure object type and the pollable network infrastructure object status.

37. The system of claim 31, wherein more than one thread is usable by the one or more analyzers.

38. The system of claim 31, wherein an analyzer that analyzes a pollable network infrastructure object marks one or more of the pollable network infrastructure object, neighbor nodes of the pollable network infrastructure object, and devices connected to the pollable network infrastructure object busy until the analyzer has finished the analysis.

39. The system of claim 31, wherein if a pollable network infrastructure object that comprises an assigned priority is busy, then an analyzer skips analysis of the pollable network infrastructure object and selects a next item from the queue.

40. The system of claim 31, wherein pollable network infrastructure objects in a Fault Area are operable to be processed before pollable network infrastructure objects in a Far-From-Fault Area.

41. A non-transitory computer readable medium storing instructions that, when executed on a programmed processor, reduce network infrastructure fault analysis time in a network, comprising:
  instructions for receiving poll responses from each pollable network infrastructure objects within a fault area, the fault area comprising a portion of the network comprising network infrastructure objects that contain a fault and network infrastructure objects not containing faults that are directly connected to the network infrastructure objects that contain a fault;
  instructions for assigning priorities to each received poll response of the received poll responses; and
  instructions for processing the assigned priorities of the received poll responses and the corresponding received poll responses to determine any network infrastructure fault locations within the fault area, wherein for the plurality of pollable network infrastructure objects a poll result of a pollable network infrastructure object with a higher priority is processed before a second poll result of a second pollable network infrastructure object with a lower priority.

42. A system for locating a network infrastructure fault in a network, comprising:
  means for receiving poll responses from each pollable network infrastructure objects within a fault area, the fault area comprising a portion of the network comprising network infrastructure objects that contain a fault and network infrastructure objects not containing faults that are directly connected to the network infrastructure objects that contain a fault;
  means for assigning, in conjunction with one or more analyzers, priorities to each received poll response of the received poll responses; and
  means for using the assigned priorities of the received poll responses and the corresponding received poll responses to determine a network infrastructure fault location within the fault area, wherein for the plurality of pollable network infrastructure objects a poll response for a pollable network infrastructure object with a higher priority is processed before a second poll response for a second pollable network infrastructure object with a lower priority.

* * * * *

UNITED STATES PATENT AND TRADEMARK OFFICE
CERTIFICATE OF CORRECTION

| | | |
|---|---|---|
| PATENT NO. | : 8,068,432 B2 | |
| APPLICATION NO. | : 10/986966 | |
| DATED | : November 29, 2011 | |
| INVENTOR(S) | : Anthony Paul Michael Walker et al. | |

It is certified that error appears in the above-identified patent and that said Letters Patent is hereby corrected as shown below:

In column 9, line 3, in Claim 14, delete "claim 13," and insert -- claim 12, --, therefor.

In column 9, line 8, in Claim 15, delete "AND" and insert -- and --, therefor.

Signed and Sealed this
Fifteenth Day of January, 2013

David J. Kappos
*Director of the United States Patent and Trademark Office*